United States Patent
Deyda

(10) Patent No.: US 8,828,587 B2
(45) Date of Patent: Sep. 9, 2014

(54) DEACTIVATION OR SEVERING OF AN ENERGY STORE

(75) Inventor: Andreas Deyda, Lehre (DE)

(73) Assignee: Volkswagen AG, Wolfsburg (DE)

( * ) Notice: Subject to any disclaimer, the term of this patent is extended or adjusted under 35 U.S.C. 154(b) by 194 days.

(21) Appl. No.: 13/505,213

(22) PCT Filed: Oct. 18, 2010

(86) PCT No.: PCT/EP2010/006340
§ 371 (c)(1),
(2), (4) Date: Jul. 20, 2012

(87) PCT Pub. No.: WO2011/050913
PCT Pub. Date: May 5, 2011

(65) Prior Publication Data
US 2012/0276422 A1    Nov. 1, 2012

(30) Foreign Application Priority Data
Oct. 28, 2009    (DE) .......................... 10 2009 050 996

(51) Int. Cl.
| | |
|---|---|
| H01M 2/20 | (2006.01) |
| H01M 2/34 | (2006.01) |
| H01M 10/42 | (2006.01) |
| H01M 2/10 | (2006.01) |
| H01H 39/00 | (2006.01) |
| B60L 3/00 | (2006.01) |
| B60L 3/04 | (2006.01) |
| B60L 11/18 | (2006.01) |

(52) U.S. Cl.
CPC .......... *H01H 39/006* (2013.01); *H01M 2/1077* (2013.01); *B60L 3/0007* (2013.01); *H01M 2/206* (2013.01); *H01M 2/347* (2013.01); *B60L 3/04* (2013.01); *B60L 3/0046* (2013.01); *H01M 2/34* (2013.01); *H01H 2039/008* (2013.01); *B60L 11/1864* (2013.01); *Y02E 60/12* (2013.01)
USPC ................ 429/158; 429/50; 429/61; 429/160

(58) Field of Classification Search
USPC ..................... 429/50, 160, 158; 439/500, 516
See application file for complete search history.

(56) References Cited

U.S. PATENT DOCUMENTS

| 6,556,119 B1 | 4/2003 | Lell |
| 2011/0052946 A1 | 3/2011 | Schaefer et al. |

FOREIGN PATENT DOCUMENTS

| DE | 44 13 847 | 11/1994 |
| DE | 10 2006 049 270 | 4/2008 |
| DE | 10 2008 006 026 | 7/2009 |
| DE | 10 2008 010 971 | 8/2009 |
| WO | 99/54904 | 10/1999 |
| WO | 2008/076040 | 6/2008 |

OTHER PUBLICATIONS

International Search Report, issued in corresponding International Application No. PCT/EP2010/006340.

*Primary Examiner* — Gregg Cantelmo
(74) *Attorney, Agent, or Firm* — Kenyon & Kenyon LLP

(57) ABSTRACT

An energy store device, especially for a motor vehicle, includes at least two energy sources, which are connected via an electrical connection, and at least one safety element, the safety element being deformable and/or expandable in order to sever the electrical connection between the energy sources. In a method for severing electrical connections of an energy store device having at least two energy sources, a short-circuit risk is determined with the aid of at least one determination device, a propellant is activated following a determination result of the determination device, and at least one safety element is deformed and/or expanded by the activation of the propellant, in order to sever at least one electrical connection of the energy store device.

20 Claims, 1 Drawing Sheet

DEACTIVATION OR SEVERING OF AN ENERGY STORE

FIELD OF THE INVENTION

The present invention relates to an energy store device for a motor vehicle, in particular a hybrid electrical vehicle, having at least two energy sources, e.g., battery cells, and to a method for severing electrical connections of such an energy store device.

BACKGROUND INFORMATION

In accident situations of a vehicle, especially a hybrid or electrical vehicle, a battery housing, which usually is made of metal and includes one or more battery cell(s), can press against the battery poles of the battery or the battery cell at two locations, because of deformation of the vehicle body, which may short-circuit the battery and cause it to burst open due to the produced heat loss. A short circuit in the vehicle electrical system or in the battery leads to heat development at the contact points of the short circuit and could pose a fire hazard to the battery and the vehicle. It must be ensured that the vehicle battery will not be short-circuited during or after an accident and that it is safely cut off from the vehicle electrical system.

A number of safety devices in motor vehicles are available for separating the battery of vehicle electrical systems. In such safety devices, the vehicle electrical system switches off the electrical current output by a vehicle battery, for instance by severing the electrical connection to the battery using a knife, for example, in order to quickly and reliably separate the battery from the vehicle electrical system in case of damage or other emergency situations. This prevents damage of technical devices or it prevents people from being exposed to danger. In such a case, the lines of the vehicles leading out of a battery system are severed when a crash has occurred. Nevertheless, the vehicle battery remains operable and is not excluded from a potential short-circuit.

A device for separating an electrical current circuit is described in PCT International Published Patent Application No. WO 99/54904, in which an activatable device can generate a trigger pressure, which acts on a current line either directly or via rigid means.

German Patent No. 44 13 847 discloses a safety device for a motor vehicle having a deactivation device, by which an electrical energy source can be separated from a electrical system of a vehicle, the deactivation device including severing device such as a knife to which a propellant can be applied.

SUMMARY

Example embodiments of the present invention provide an energy store device which has at least two energy sources and which offers protection from a short circuit.

Example embodiments of the present invention avoid a possible direct electrical connection between the positive pole and the negative pole of an energy source, so that the risk of a short-circuit is eliminated. An energy store device is provided that has at least two energy sources, which are connected via an electrical connection; the energy store device has at least one safety element for severing the electrical connection between the energy sources, the safety element being deformable and/or expandable in order interrupt the electrical connection. If the risk of a short-circuit arises in the energy-store device, the energy sources or a current circuit connected thereto, the safety element, by its deformation or expansion, is able to exert direct pressure on the electrical connection in order to interrupt it irreversibly. The energy store device, for instance, may be arranged as a battery having two or more battery cells for a motor vehicle, especially a hybrid/electrical vehicle.

The energy store device may have at least one propellant for deforming and/or expanding the safety element. The propellant may be a crash propellant charge and activated, for instance, by a controllable trigger unit in the event of a crash. If the propellant charge has been ignited, the safety element expands, and a force generated by its expansion exerts direct pressure on the electrical connection of the energy sources, so that the electrical connection is interrupted.

The energy store device may have at least one determination device, especially a crash sensor, and the propellant is able to be activated following a determination result of the determination device. If the determination device has detected an emergency situation (such as an impact), it transmits an electrical signal, for example to a control unit, which in turn is able to activate the trigger unit of the propellant.

The safety element may be arranged as elastic web or plastic hose. If the hose is deformed or if it expands, the cross section of the hose becomes larger. Due to the expansion, the hose then directly strikes the electrical connection of the energy sources in order to interrupt this connection. Such a hose may be used repeatedly after its deformation or expansion, without exchanging it, once it has deflated to its original state again.

The electrical connection may have at least one preset rupture joint, especially a groove. In this manner, for one, at least one interruption point of the electrical joint is specified in advance, and, for another, this predefined rupture joint makes it easy to interrupt the electrical connection. If the electrical connection is made of a brittle electrically conductive material such as a particular copper alloy or cast aluminum, then the electrical connection is easy to interrupt.

The safety element may be arranged between the electrical connection and the energy sources. Since the distance in-between is usually small, but the expanded safety element has a relatively larger cross-section, the safety element is able to exert the expansion force on the electrical connection in a more optimal and forceful manner. In addition, the required space for the energy storage device is able to be reduced because additional room for the safety element is saved by placing it between the electrical connection and the energy sources.

In addition, a method for severing electrical connections of an energy store device, especially for a motor vehicle having at least two energy sources is provided, in which a short-circuit risk of the energy store device, in particular an accident, is determined with the aid of at least one determination device, such as a crash sensor, and in which a propellant is activated following a determination result of the determination device, whereupon at least one safety element is deformed and/or expanded by the activation of the propellant, in order to sever at least one electrical connection of the energy store device.

In the following text, example embodiments of the present invention will be described in greater detail with reference to the figures.

DETAILED DESCRIPTION

Figure 1:
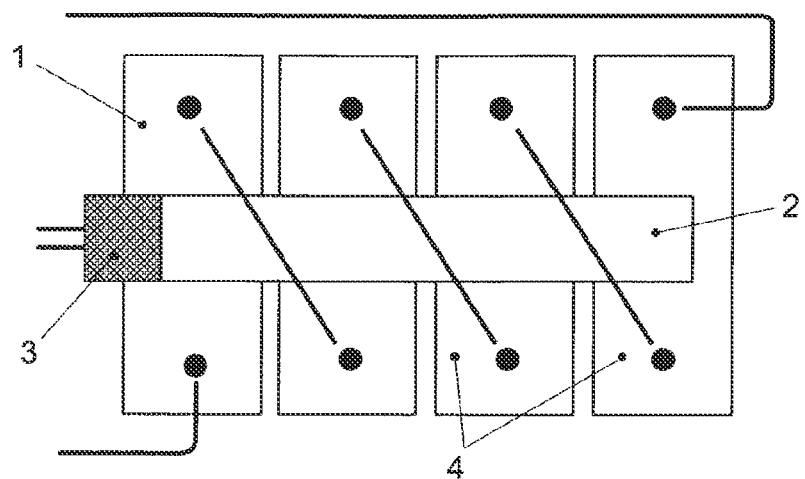
FIG. 1 illustrates an energy store device having a safety element.

FIG. 1 shows an energy store device implemented as a vehicle battery, which has a plurality of battery cells 1 connected in series, and a safety element 2. Safety element 2 may be arranged in the form of an elastic hose. Electrical connections 4 may be made of a particular copper alloy or cast aluminum and thus have a brittle design. Electrical connections 4 in each case bridge positive pole 6 and negative pole 7 of two adjacent battery cells 1, in order to establish a series connection between battery cells 1. Safety element 2 is situated between electrical connections 4 and battery cells 1, safety element 2 with its longitudinal axis being installed on battery cells 1 substantially transversely to electrical connections 4 and between plus poles 6 and minus poles 7. A crash propellant charge 3, which is ignitable or activatable during a crash in order to expand safety element 2, is situated at one end of safety element 2.

Figures 2A, 2B:
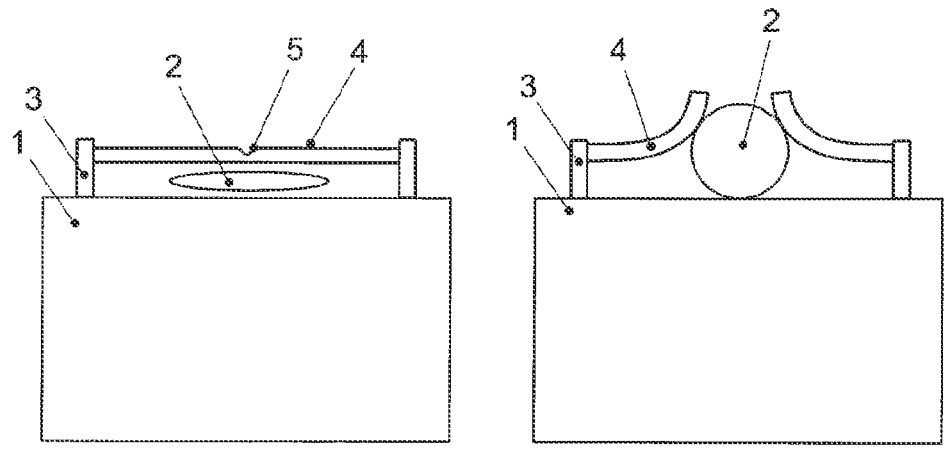
FIG. 2 illustrates a safety element in the form of a hose.

FIG. 2 shows that safety element 2 is arranged as an elastic hose, and it illustrates the manner in which hose 2 functions in order to sever electrical connections 4. Hose 2 is shown in its original state (a) and in its expanded state (b). Each electrical connection 4 is adapted to include at least one groove 5. Such grooves may define a preset breaking point of electrical connection 4.

This facilitates the severing of the connection when a power of impact exerts pressure against connection 4 from below. Connection 4 bends in the upward direction at the location of groove 5 and fractures at this location.

In the standard case, hose 2 is situated between electrical connections 4 and battery cells 1 in its original state. In the event of a crash, a determination device of the battery or the vehicle, especially a crash sensor (not shown here), is able to detect the crash and transmits an electrical signal to a safety system of the vehicle, which activates crash propellant charge 3. Following the ignition, crash propellant charge 3 burns down and generates high-pressure combustion gases in hose 2. The increasing internal pressure causes hose 2 to assume an expanding cross-section, which is larger than in the original state. As the cross-section increases, the outer wall of hose 2 strikes electrical connections 4. Thus, hose 2 exerts a power of impact directly on connections 4 via its tensioned outer wall, and breaks connections 4 at grooves 5. The battery, or battery cells 1, are then switched off in a safe manner, so that a short-circuit in the battery or in battery cells 1 is no longer possible. The battery is also electrically separable from the onboard electrical system of the vehicle by hose 2. After interrupting electrical connections 4, hose 2 is able to shrink back to its original state so that hose 2 may be used as safety element for the battery repeatedly, without the need to exchange it.

In addition, the energy store device shown above is also able to be interconnected with other energy store devices. The total energy stored is increased. This is especially beneficial for obtaining a number of battery cells for an electrical vehicle that is sufficient for an acceptable range.

The invention claimed is:

1. An energy store device, comprising:
    at least two energy sources connected;
    an electrical connection between the energy sources; and
    at least one safety device deformable and/or expandable to separate the electrical connection between the energy sources;
    wherein the at least one safety device is adapted to press directly against the electrical connection when deformed and/or expanded.

2. The energy store device according to claim 1, wherein the energy store device is arranged in a motor vehicle.

3. The energy store device according to claim 1, wherein the energy store device is arranged as an energy store device for a motor vehicle.

4. The energy store device according to claim 1, further comprising at least one propellant adapted to deform and/or expand the safety device.

5. The energy store device according to claim 4, further comprising at least one determination device adapted to activate the propellant in response to a determination result of the determination device.

6. The energy store device according to claim 5, wherein the determination device includes a crash sensor.

7. An energy store device, comprising:
    at least two energy sources connected;
    an electrical connection between the energy sources; and
    at least one safety device deformable and/or expandable to separate the electrical connection between the energy sources;
    wherein the at least one safety device is adapted to press directly against the electrical connection when deformed and/or expanded; and
    wherein the safety device includes a web and/or a plastic hose.

8. The energy store device according to claim 1, wherein the safety device is usable repeatedly to sever the electrical connection.

9. The energy store device according to claim 1, wherein the electrical connection includes at least one preset rupture point.

10. The energy store device according to claim 9, wherein the rupture point includes a groove.

11. An energy store device, comprising:
    at least two energy sources connected;
    an electrical connection between the energy sources; and
    at least one safety device deformable and/or expandable to separate the electrical connection between the energy sources;
    wherein the at least one safety device is adapted to press directly against the electrical connection when deformed and/or expanded; and
    wherein the safety device is arranged between the electrical connection and the energy sources.

12. A method for severing electrical connections of an energy store device having at least two energy sources, comprising:
    determining a short-circuit risk of the energy store device with the aid of at least one determination device;
    activating a propellant following a determination result of the determination device; and
    deforming and/or expanding at least one safety device by the activation of the propellant to sever at least one electrical connection of the energy store device;
    wherein the at least one safety device is adapted to press directly against the electrical connection when deformed and/or expanded.

13. The method according to claim 12, wherein the energy store device is arranged in a motor vehicle.

14. The method according to claim 12, wherein the energy store device is arranged as an energy store device for a motor vehicle.

15. The method according to claim 12, wherein the short-circuit risk includes an accidental crash.

16. The method according to claim 12, wherein the determination device includes a crash sensor.

17. A method for severing electrical connections of an energy store device having at least two energy sources, comprising:
 determining a short-circuit risk of the energy store device with the aid of at least one determination device;
 activating a propellant following a determination result of the determination device; and
 deforming and/or expanding at least one safety device by the activation of the propellant to sever at least one electrical connection of the energy store device;
 wherein the at least one safety device is adapted to press directly against the electrical connection when deformed and/or expanded; and
 wherein the safety device includes a web and/or a plastic hose, and the safety device being deformed and/or expanded transversely to a longitudinal axis of the safety device to sever the electrical connection.

18. The method according to claim 12, wherein the electrical connection includes at least one preset rupture point.

19. The method according to claim 18, wherein the rupture point includes a groove.

20. A method for severing electrical connections of an energy store device having at least two energy sources, comprising:
 determining a short-circuit risk of the energy store device with the aid of at least one determination device;
 activating a propellant following a determination result of the determination device; and
 deforming and/or expanding at least one safety device by the activation of the propellant to sever at least one electrical connection of the energy store device;
 wherein the at least one safety device is adapted to press directly against the electrical connection when deformed and/or expanded; and
 wherein the safety device is arranged between the electrical connection and the energy sources.

* * * * *